United States Patent [19]
Borenstein

[11] Patent Number: 5,456,332
[45] Date of Patent: Oct. 10, 1995

[54] MULTIPLE-DEGREE-OF-FREEDOM VEHICLE

[75] Inventor: Johann Borenstein, Ann Arbor, Mich.

[73] Assignee: The Board of Regents of the University of Michigan, Ann Arbor, Mich.

[21] Appl. No.: 973,999

[22] Filed: Nov. 10, 1992

[51] Int. Cl.$^6$ ............................. B60K 17/34; B62D 6/00; B62D 7/02
[52] U.S. Cl. .................. 180/167; 180/6.48; 180/8.2; 180/9.46; 180/22; 180/79.1
[58] Field of Search ........................ 180/167, 79.1, 180/6.48, 8.2, 9.46, 9.48, 6.7, 22

[56] References Cited

U.S. PATENT DOCUMENTS

| | | | |
|---|---|---|---|
| 3,550,708 | 12/1970 | Paramythioti | 180/6.48 |
| 3,666,034 | 5/1972 | Stuller et al. | 180/6.48 |
| 3,938,608 | 2/1976 | Folco-Zambelli | 180/21 |
| 4,029,165 | 6/1977 | Miller et al. | 180/9.46 |
| 4,221,273 | 9/1980 | Finden | 180/6.48 |
| 4,529,052 | 7/1985 | Imai et al. | 180/6.48 |
| 4,694,923 | 9/1987 | Grenzicki | 180/6.5 |
| 4,932,489 | 6/1990 | Evans et al. | 180/6.2 |
| 5,083,629 | 1/1992 | Chang | 180/168 |
| 5,125,467 | 6/1992 | Mancheron | 180/9.46 |

FOREIGN PATENT DOCUMENTS

| | | | |
|---|---|---|---|
| 4005357 | 8/1991 | Germany | 180/8.2 |
| 4005356 | 8/1991 | Germany | 180/8.2 |
| 275069 | 12/1986 | Japan | 180/8.2 |

Primary Examiner—Mitchell J. Hill
Attorney, Agent, or Firm—Rohm & Monsanto

[57] ABSTRACT

A multi-degree-of-freedom vehicle employs a compliant linkage to accommodate the need for a variation in the distance between drive wheels or drive systems which are independently steerable and drivable. The subject vehicle is provided with rotary encodes to provide signals representative of the orientation of the steering pivot associated with each such drive wheel or system, and a linear encoder which issues a signal representative of the fluctuations in the distance between the drive elements. The wheels of the vehicle are steered and driven in response to the linear encoder signal, there being provided a controller system for minimizing the fluctuations in the distance. The controller system is a software implementation of a plurality of controllers, operating at the chassis level and at the vehicle level. A trajectory interpolator receives x-displacement, y-displacement, and θ-displacement signals and produces to the vehicle level controller trajectory signals corresponding to interpolated control signals. The x-displacement, y-displacement, and θ-displacement signals are received from a human operator, via a manipulable joy stick.

30 Claims, 13 Drawing Sheets

RUN 1

RUN 2

RUN 3

RUN 4

[1]

MULTIPLE-DEGREE-OF-FREEDOM VEHICLE

GOVERNMENT RIGHTS IN THE INVENTION

The research on which the invention herein is based was funded by NSF Grant No. DDM-9114394 and in part by the Department of Energy. The government of the United States of America has certain rights in the invention.

BACKGROUND OF THE INVENTION

1. Field of the Invention

This invention relates generally to automated guided vehicles (AGVs), autonomous mobile robots (AMRs), remotely controlled robots (RCRs), and the like, and more particularly, to a multiple-degree-of-freedom (MDOF) vehicle wherein wheel slippage is eliminated and/or rendered inconsequential by permitting the distance between two drive chassis on the same vehicle to be monitored and using a resulting distance measurement signal to control vehicle operation.

2. Description of the Related Art

The ability of AGVs to perform industrial functions has increased as computer technology advances. Oftentimes, these vehicles are guided by wires which are embedded into the floor. AMRs, on the other hand, navigate autonomously, and are useful in situations where in-floor guide-wiring is not available. In hazardous environments, such as in nuclear power plants and radioactive storage sites, RCRs are particularly useful. All of these vehicles have drawbacks which prevent them from achieving optimum levels of operation.

Conventional vehicles use either a differential drive design which employs two drive wheels, each with its own motor, or a tricycle design, where one wheel is steered and driven. Vehicles which employ these operating arrangements are easy to control and more maneuverable than automobiles, for example. However, in many applications, floor space is quite limited, and there is therefore a need for even greater maneuverability. This is particularly true in environments which have not been designed to accommodate automatic vehicles.

One known system which improves maneuverability is the so called "synchro-drive" arrangement. Vehicles which employ this known drive system typically have three driven and steered wheels that are mechanically linked to one drive motor and one steering motor. These vehicles provide only two degrees of freedom. However, the three wheels can be steered into any direction, but are always parallel to each other. Thus, although this design permits the vehicle to move in all directions, there is not control over the orientation of the vehicle body, since only the wheels turn.

Full control over travel direction and orientation has been achieved with special wheels which can roll sideways. Usually, such vehicles are driven by three or four independent drive motors. Although these vehicles are useful in some applications, their utility is limited to usage on smooth and regular surfaces. Most industrial applications do not provide such smooth surfaces.

For purposes of the present discussion, MDOF vehicles are limited to have full-sized, conventional wheels. Such vehicles are excellent for transport tasks in confined spaces. In theory, MDOF vehicles are extremely maneuverable, they are capable of turning in a confined space; they can move sideways, and can perform maneuvers which allow the vehicle to move along a mathematically optimal trajectory. Good MDOF designs are capable of reducing significantly the amount of floor space necessary to achieve safe operation of the vehicle.

Although a vehicle which employs more than two independently controlled axles offers exceptional advantages from the standpoint of maneuverability, exceptional difficulties are encountered from the standpoint of control. FIG. 1 is a schematic representation which shows a typical design of a MDOF vehicle 10, specifically a four-degree-of-freedom vehicle, which is known to persons of skill in the art. As shown, vehicle 10 has a left drive wheel 11 and a right drive wheel 12 which, in addition to being rotated to perform the drive function, they are also steerable, as shown by the circular arrows. Four castors 13, arranged at the vehicle corners, provide stability. In this known arrangement, driver wheels 11 and 12 are set apart by a fixed distance d. A known vehicle employing the drive system of FIG. 1 having two tricycle drives and employing a total of four motors was developed and built at the Oak Ridge National Laboratory, and denominated as HERMIES-III.

Experiments have established that this known design yields large position errors resulting from severe wheel slippage after performing certain maneuvers. Similar results, plus severe oscillations with servo errors in the drive and steering motors have been reported in six-degree-of-freedom vehicles employing conventional designs, such as the PLUTO machine developed at Carnegie-Mellon University.

FIG. 2 is useful to illustrate the concept of instantaneous center of rotation ("ICR") as described in U.S. Pat. No. 4,932,489. As shown in this figure, a vehicle 20 is attempting to maneuver around the end of a wall 21. This concept for controlling the trajectory of a MDOF vehicle assumes that a higher-level trajectory planner has determined that points A and B on the vehicle should momentarily travel in the directions $\alpha$, illustrated by arrow 22, and $\beta$, illustrated by arrow 23, as shown in FIG. 2. The desired trajectory, which is designated as 25 in the figure, can be prescribed by a guide wire in AGV applications, or an obstacle avoidance system in AMR applications.

The ICR concept is borrowed from the areas of machine design and kinematics. It utilizes the fiction of an imaginary point, illustratively point 26 in the figure, about which a rigid body (e.g., vehicle 20) appears to be rotating momentarily, i.e., for an instant dt, while the body is rotating and translating. In pure translatory motion, the ICR is located at a distance $\infty$ from the body. A special case of translatory motion exists when both wheels are parallel to the longitudinal axis of motion. This configuration corresponds to the widely used differential drive where two wheels are located on the same axis, but are driven by individual motors. Hereinafter, this shall be termed the "normal" configuration, and, by contrast, the term "crabbing" is used when at least one wheel is not oriented parallel to the longitudinal axis of the vehicle.

In FIG. 2, ICR 26 is situated at the cross point of the two normals to the steering directions $\alpha$ and $\beta$. Then, the orientation of the two wheels is set normal to the two position vectors $r_1$ and $r_2$. Clearly, this orientation of the two wheels will cause rotation around the ICR and consequently, rotation around the ICR results in points A and B momentarily having the required steering directions. However, the velocities of the wheels must maintain the relationship:

$$\frac{V_1}{V_2} = \frac{r_1}{r_2} \qquad \text{Eq. 1}$$

Eq. 1 is known in the literature as the "Rigid Body Constraint." It should be noted that $V_1$ will be independent from $V_2$ when $r_1 + r_2 = \infty$, i.e., in the normal configuration. It is also important to point out that the ICR concept can be applied to vehicles with any number of degrees of freedom, e.g., 4 drive/4 steer kinematics.

One theoretically interesting type of crabbing occurs when both wheels are turned 90° sideways, allowing the vehicle to travel sideways in confined areas. However, this important capability is not necessarily feasible with existing vehicles, as will be shown hereinbelow.

The problem with the ICR concept is that Eq. 1 must be met accurately, i.e., the ratio between the two velocities must be maintained, or otherwise wheel slippage will occur. It is a problem with known arrangements that conventional DC motor velocity control loops do not precisely follow the prescribed velocity profile during transients. The integral of these errors over time translates into permanent (not transient) position errors for each wheel. In other words, even if both control loops had the same velocity reference commands, each loop would still end up with different pulse counts from the encoders. For the simple case of the normal configuration, the pulse count difference $\Delta s$ causes an orientation error $\Delta\theta$ that can be expressed as:

$$\Delta\theta = \Delta s / b \qquad \text{Eq. 2}$$

If not corrected immediately, $\Delta\theta$ may cause a very large lateral position error during subsequent motion. Even under steady-state conditions, mechanical disturbances on the wheels, e.g., bearing friction, will cause the wheels to rotate temporarily at different speeds, and therefore generate different numbers of pulses.

The errors discussed hereinabove with respect to the 4-DOF mobile robot are not the only significant ones. These vehicles are subject to additional errors beyond the orientation error $\Delta\theta$. The errors are generally so grave that crabbing motion is generally unfeasible with the design of FIG. 1. As discussed hereinabove, any difference in pulse counts as generates a rotary motion about the center of the robot. Even in normal configuration, this rotary motion will cause an orientation error $\Delta\theta$. In the normal configuration this rotary motion is considered "permissible," since it does not cause slippage. Slippage causes much more severe problems than do position errors caused by inadequate control. This results from the fact that slippage errors cannot be corrected, while control-type errors can. By contrast, when operating in crabbing motion, the encoder pulse difference $\Delta s$ does cause slippage.

FIG. 3 is useful to illustrate the effect of $\Delta s$ during crabbing. Assume that right wheel 31 is stationary while left wheel 32 rotates through the extra distance $\Delta s$. Decomposing $\Delta s$ into its orthogonal components, $\Delta s_x = \Delta s \sin\alpha$ and $\Delta s_y = \Delta s \cos\alpha$, it is clear from FIG. 3 that $\Delta s_y$ is completely lost to slippage because the distance d between the drive wheels of this known arrangement is physically fixed.

It has been concluded by the inventor herein that there is a need for a mechanical arrangement which accommodates temporary discrepancies between pulse counts, until the controllers catch up to correct the problem. The inability of known arrangements to accommodate position errors $\Delta s$ is the reason these arrangements shake and rattle during operation. These known arrangements attempt to accommodate the position errors through unintentional compliance, such as backlash, resulting in extensive wheel slippage.

In addition to the inherent control problems encountered when endeavoring to maintain accurate velocity ratios between the drive wheels during crabbing, other problems exist in most known systems. One such problem results from unequal wheel diameter.

In order to improve traction, most vehicles use rubber wheels. It is, however, difficult to manufacture rubber wheels with exactly the same diameter. In addition, unequally distributed loads will compress one wheel slightly more than the other, resulting in a difference between the effective rolling radii of the wheels. As the motor controller attempts to translate wheel revolutions into linear travel distance, the computation is based on nominal wheel diameter, and therefore, even a small difference from the nominal diameter renders the computation inaccurate. The result is a relative position error $\Delta s$. It is noteworthy that this source error is constant, at least until the loading of the vehicle is changed, resulting in a constant wheel slippage rate in the conventional MDOF vehicle.

Additional error is introduced by misalignment of the wheels. This will result in slippage in any vehicle. However, in certain MDOF vehicles, the problem is exacerbated by the fact that backlash and limitations in the resolution of the steering mechanism introduce much greater misalignment errors than mechanically fixed wheels do. Such misalignment will render Eq. 1 inaccurate and increase the wheel slippage.

It is, therefore, an object of this invention to provide a multiple-degree-of-freedom vehicle which can provide excellent maneuverability, while avoiding wheel slippage.

It is another object of this invention to provide a multiple-degree-of-freedom vehicle which can provide sideways (crabbing) motion and the ability to negotiate tight turns.

It is also an object of this invention to provide a multiple-degree-of-freedom vehicle which can provide a high payload capacity.

It is a further object of this invention to provide a multiple-degree-of-freedom vehicle which can provide improved traction with all wheels driven.

It is additionally an object of this invention to provide a multiple-degree-of-freedom vehicle which can provide high static and dynamic stability.

It is yet a further object of this invention to provide a multiple-degree-of-freedom vehicle which can execute maneuvers without the error which results from wheel slippage.

It is also another object of this invention to provide a multiple-degree-of-freedom vehicle which can execute maneuvers without the oscillations and other errors which have plagued prior art designs.

It is yet a further an additional object of this invention to provide a multiple-degree-of-freedom vehicle which can execute maneuvers quietly, without the grinding and shaking noises of prior art designs.

It is still another object of this invention to provide a multiple-degree-of-freedom vehicle which overcomes problems resulting from differences in effective wheel size caused by wear, manufacturing tolerances, or loading.

It is a yet further object of this invention to provide a multiple-degree-of-freedom vehicle which overcomes problems resulting from wheel misalignment.

It is also a further object of this invention to provide a robotic implementation of a multiple-degree-of-freedom vehicle which can be operated intuitively by a human operator using a remote joy-stick.

It is additionally another object of this invention to provide a multiple-degree-of-freedom vehicle which overcomes problems resulting from non-point contact of a wheel with the floor.

A still further object of this invention is to provide a multiple-degree-of-freedom vehicle which overcomes problems resulting from operating a vehicle on an uneven floor.

Yet another object of this invention is to provide a multiple-degree-of-freedom vehicle which can function adequately even when one or more motors on an axle fail.

Another object of this invention is to provide a multiple-degree-of-freedom vehicle which enjoys the benefits of a widened wheelbase without sacrificing maneuverability.

SUMMARY OF THE INVENTION

The foregoing and other objects are achieved by this invention which provides in accordance with a first aspect thereof a drive arrangement for a vehicle having a first drive assembly having at least one drive wheel associated therewith, the first drive assembly being coupled to the vehicle, and a second drive assembly, also having at least one drive wheel associated therewith. In accordance with this aspect of the invention, the second drive assembly is coupled to the vehicle at a pivot point and is controllably rotatable thereabout. The second pivot point is displaceable with respect to the vehicle. There is further provided a displacement monitor for producing a displacement monitoring signal responsive to the displacement of the second drive assembly with respect to the vehicle, and a controller for issuing a control signal in response to the displacement monitoring signal.

In a specific illustrative embodiment of the invention, the drive arrangement is provided with pivot rotation driver for controllably rotating the second drive assembly about the pivot point in response to the displacement monitoring signal. In addition, there is further provided an arrangement for controlling the drive wheel of the second drive assembly in response to the displacement monitoring signal. In a still further embodiment, there is provided a controller for controlling the drive wheel of the first drive assembly in response to the displacement monitoring signal.

In embodiments where the first and second drive assemblies are coupled to the vehicle by respective pivots, it is the essence of the invention that the second pivot point is not fixed on the vehicle, but instead is free to slide toward or away from the first pivot point. This design results in an arrangement which the inventor herein has termed "compliant linkage." Momentary controller errors are thereby accommodated without causing wheel slippage. The control signal modifies the drive motor speeds so as to counteract all deviation from a predetermined nominal distance between the two pivot points.

In accordance with another aspect of the invention, a drive arrangement is provided for a multiple degree of freedom vehicle which has a plurality of drive wheels. The drive arrangement is provided with first and second chassis members each having at least one drive wheel associated therewith, each chassis member being steerable with respect to the vehicle and coupled thereto at a predetermined nominal distance from one another. A distance monitor produces a distance monitoring signal responsive to a variation in the predetermined nominal distance between the first and second chassis members. A drive control arrangement controls the plurality of drive wheels in response to the variation in the predetermined nominal distance between the first and second chassis members.

In a specific illustrative embodiment of this further aspect of the invention, there are provided a first coupler for coupling the first chassis member to the vehicle and a first rotation encoder for producing a first rotation position signal responsive to variations in the rotational orientation of the first chassis member with respect to the vehicle. Further with respect to this embodiment, there are further provided a second coupler for coupling the second chassis member to the vehicle and a second rotation encoder for producing a second rotation position signal responsive to a rotational orientation of the second chassis member with respect to the vehicle. Preferably, the second coupler may be in the form of a compliant linkage element for permitting the second chassis member to move over a predetermined distance with respect to the first chassis member.

Further with respect to this illustrative embodiment, there is provided a compliance element for permitting the predetermined nominal distance between the first and second chassis members to vary as the need arises to prevent slippage of the drive wheels. In embodiments of the invention where the vehicle is a multi-degree-of-freedom vehicle, the drive control arrangement is of the type which functions digitally so as to have predetermined sample periods, and the compliance element is in the form of a compliance linkage which is arranged to accommodate displacement discrepancies between the first and second chassis members which would otherwise cause wheel slippage during operation of the vehicle until correction therefor is made by the drive control arrangement in response to the distance monitoring signal.

In accordance with a still further aspect of the invention, a drive arrangement for a vehicle is provided with a first drive assembly which has at least one drive wheel associated therewith, the first drive assembly being coupled to the vehicle at a first pivot point and being rotatable thereabout. A second drive assembly, also having at least one drive wheel associated therewith, is also coupled to the vehicle, but at a second pivot point so as to be rotatable thereabout. The second pivot point, however, is displaceable so as to be located within a predetermined range of distances from the first pivot point in this aspect of the invention. A distance monitoring device is provided for producing a distance monitoring signal responsive to the distance between the first and second pivot points. Additionally, a drive controller is provided for controlling the plurality of drive wheels in response to the distance monitoring signal.

In a specific illustrative embodiment of this still further aspect of the invention, there are provided first and second pivot drives associated with respectively associated ones of the first and second drive assemblies for rotating same about their respective first and second pivot points. Such pivoting results in an effective steering of the drive wheels. The stability of drive assemblies may be enhanced by providing one or more castor wheels for each of the drive assemblies. The castor wheels may be of a known type which rotate and pivot freely. The rotation about the pivot points is, in this embodiment, performed under the control of a controller which responds to the distance monitoring signal.

In accordance with a further aspect of the invention, a drive arrangement for a vehicle is provided with a first drive assembly having at least one drive wheel associated therewith, the first drive assembly being coupled to the vehicle; a first steering arrangement for steering the drive wheel of the first drive assembly; a second drive assembly having at least one drive wheel associated therewith, the second drive assembly being coupled to the vehicle so as to be displaceable with respect to the first drive assembly; a second steering arrangement for steering the drive wheel of the second drive assembly; a displacement monitor for producing a displacement monitoring signal responsive to the displacement of the second drive assembly with respect to the first drive assembly; and a controller for issuing a control signal in response to the displacement monitoring signal.

In accordance with a specific embodiment of this further aspect of the invention, there is provided a first steering controller for controlling the first steering arrangement in response to the displacement monitoring signal. Similarly, a second steering controller is provided for controlling the second steering arrangement in response to the displacement monitoring signal. Additionally, controllers are provided for controlling the drive wheels of the first and second drive assemblies in response to the displacement monitoring signal.

In a yet further aspect of the invention, the drive arrangement is provided with:

a first drive assembly having a first drive wheel associated therewith, the first drive assembly being coupled to the vehicle;

a first steering arrangement for steering the first drive wheel;

a first steering monitor for producing a first steering monitor signal indicative of the steering orientation of the first drive wheel;

a first drive assembly controller for controlling the first drive wheel, the first drive assembly controller having an input for receiving a first drive wheel control signal for controlling a speed of rotation of the first drive wheel;

a second drive assembly having a second drive wheel associated therewith, the second drive assembly being coupled to the vehicle so as to be displaceable with respect to the first drive assembly;

a second steering arrangement for steering the second drive wheel;

a second steering monitor for producing a second steering monitor signal indicative of the steering orientation of the second drive wheel;

a second drive assembly controller for controlling the second drive wheel, the second drive assembly controller having an input for receiving a second drive wheel control signal for controlling a speed of rotation of the second drive wheel;

a displacement monitor for producing a displacement monitoring signal responsive to the displacement of the second drive assembly with respect to the vehicle; and a vehicle level controller for issuing a control signal in response to the displacement monitoring signal.

A vehicle controller coordinates the operations of the first and second drive assemblies, and is provided with a first input for receiving the displacement monitoring signal, a second input for receiving the first steering monitor signal and a third input for receiving the second steering monitor signal. A first output is coupled to the first drive assembly controller for producing a first drive wheel speed control signal, and a second output is coupled to the second drive assembly controller for producing a second drive wheel speed control signal.

In accordance with a specific embodiment of this aspect of the invention, there is provided operator controller which is operable by a human operator and is coupled to the vehicle controller for providing thereto:

an x-displacement signal representing a desired x-displacement specified by the operator to be executed by the vehicle;

a y-displacement signal representing a desired y-displacement specified by the operator to be executed by the vehicle; and a θ-displacement signal representing a desired θ-displacement desired by the operator to be executed by the vehicle.

In a highly advantageous embodiment, there is further provided a trajectory interpolator arranged to receive the x-displacement, y-displacement, and θ-displacement signals and produce to the vehicle controller trajectory signals corresponding to interpolated control signals. The trajectory interpolator is further provided with an alignment controller for effecting a desired orientation of the vehicle upon reaching a predetermined location, such as one designated in advance by the human operator.

In accordance with a system aspect of the invention, a system for driving a vehicle along a surface, the system includes first and second drive assemblies for urging the vehicle to travel along the surface. Each of the drive assemblies has at least a first drive wheel for engaging with the surface and is coupled to a respectively associated first drive element. A distance monitor produces a distance signal responsive to a distance between the first and second drive assemblies. In addition, a motor controller controls the speed of at least one of the drive element in response to the distance signal.

In a specific embodiment of this system aspect, at least one of the first and second drive assemblies is a drive chassis. The drive chassis is provided with a second drive wheel for engaging with the surface and is coupled to an associated second drive element. The motor controller is arranged to control a relative speed of rotation of the first and second drive elements of the drive chassis in response to the distance signal.

In accordance with a method aspect of the invention, a method of maneuvering a vehicle includes the steps of:

applying steering and drive signals to each of two drive chassis coupled to the vehicle whereby the distance between the two drive chassis varies over a predetermined range of distances;

producing a distance signal responsive to variations in the distance between the two drive chassis; and controlling at least one of the steering and drive signals in response to the distance signal.

In accordance with a specific illustrative embodiment of this method aspect of the invention, the step of controlling includes the further step of minimizing the amplitude of the distance signal. In other embodiments, there is further provided the step of trajectory interpolating for producing control signals which specify a predetermined trajectory for the vehicle. This step of trajectory interpolating is responsive to three dimensional operator control signals.

BRIEF DESCRIPTION OF THE DRAWING

Comprehension of the invention is facilitated by reading the following detailed description, in conjunction with the annexed drawing, in which:

FIG. 5 is a schematic representation of a known dual-differential drive arrangement;

FIG. 8b is a graphical plot which illustrates the fluctuations in the length of the compliant link during the simulated run of FIG. 8a;

FIG. 10b is a graphical plot which illustrates the fluctuations in the length of the compliant link during the simulated run of FIG. 10a;

FIG. 13b is a graphical plot which illustrates the fluctuations in the length of the compliant link during the experimental run of FIG. 13a.

DETAILED DESCRIPTION

Figure 4:
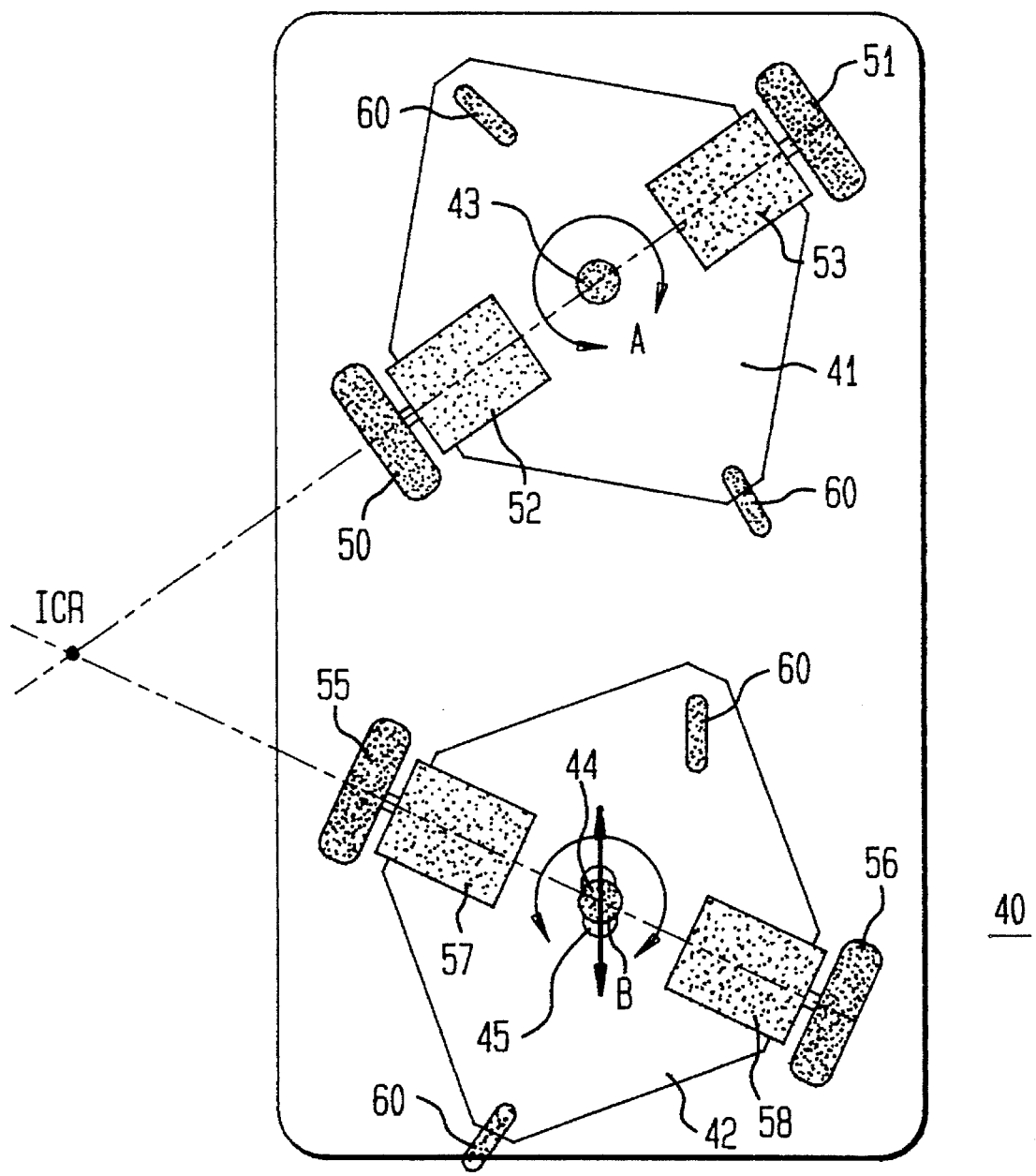
FIG. 4 is a schematic representation of a four-degree-of-freedom vehicle which employs the compliant linkage concept of the present invention.

FIG. 4 is a schematic representation of a 4-DOF design. As shown, a vehicle 40 has a first drive chassis 41 and a second drive chassis 42 installed thereon. Chassis 41 is coupled to vehicle 40 at a pivot 43 which permits a steering rotation of the chassis, as indicated by the circular arrow.

Chassis 42 also is coupled to the vehicle at a pivot, specifically pivot 44. This pivot permits chassis 42 to be rotated for purposes of steering as indicated by the associated circular arrow. However, pivot 44 is installed on a longitudinal slider 45 which permits chassis 42 to be displaceable along the vehicle, as indicated by the longitudinal arrow. Such displacement varies the distance between chassis 41 and chassis 42. Although not shown in this drawing, the invention contemplates an encoder, or some other means, of producing a signal which is representative of the location of pivot 44 along longitudinal slider 45.

Each chassis is provided with motor driven wheels. Chassis 41 has associated therewith wheels 50 and 51 having respectively associated drive motors 52 and 53 coupled thereto. Similarly, chassis 42 has wheels 55 and 56 having respective drive motors 57 and 58 coupled thereto. Each of the chassis has its respective drive wheels on a common axis, and thereby forms a so called "differential drive system" capable of moving forward, backward, and rotating, simply by controlling the relative velocities of the drive wheels. In addition, each chassis has two castors 60 which provides stability to the arrangement, particularly when traveling sideways. Also not specifically shown in this figure are encoders associated with each of the pivots, whereby a signal is issued responsive to the pivotal orientation of each chassis with respect to the vehicle.

The use of two differential drive systems to power a single vehicle, as shown in FIG. 4, results in a dual differential drive arrangement. Compliance between the two differential drive systems is provided by the longitudinal slider which accommodates for variations in the distance between chassis 41 and chassis 42, as will be described hereinbelow.

Figure 5:
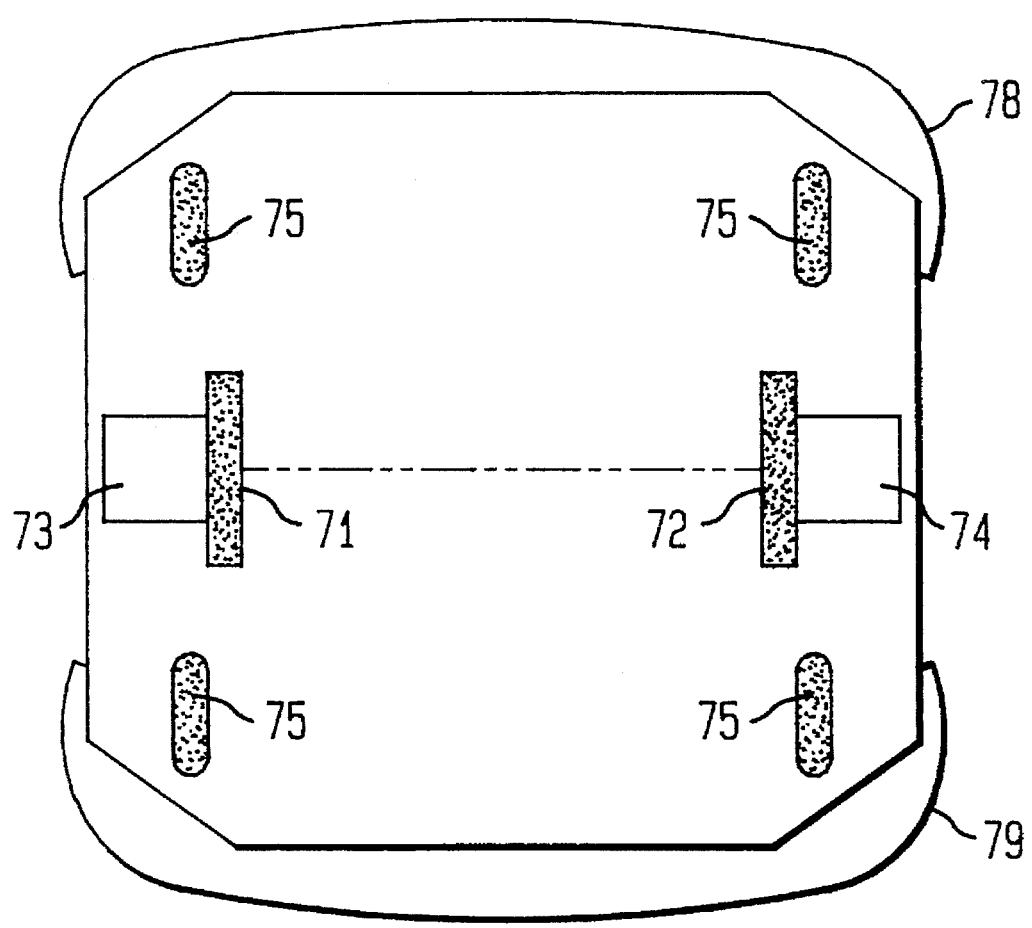

FIG. 5 is a schematic representation of a 4-DOF vehicle similar to the differential drive unit discussed hereinabove, with respect to FIG. 4. As shown in FIG. 5, a differential drive arrangement 70 is provided with wheels 71 and 72, each of which is coupled to a respective one of the drive motors 73 and 74. Arrangement 70 has four castors 75, arranged one in each corner. In addition, this known differential drive arrangement is provided with bumpers 78 and 79.

Figure 6:
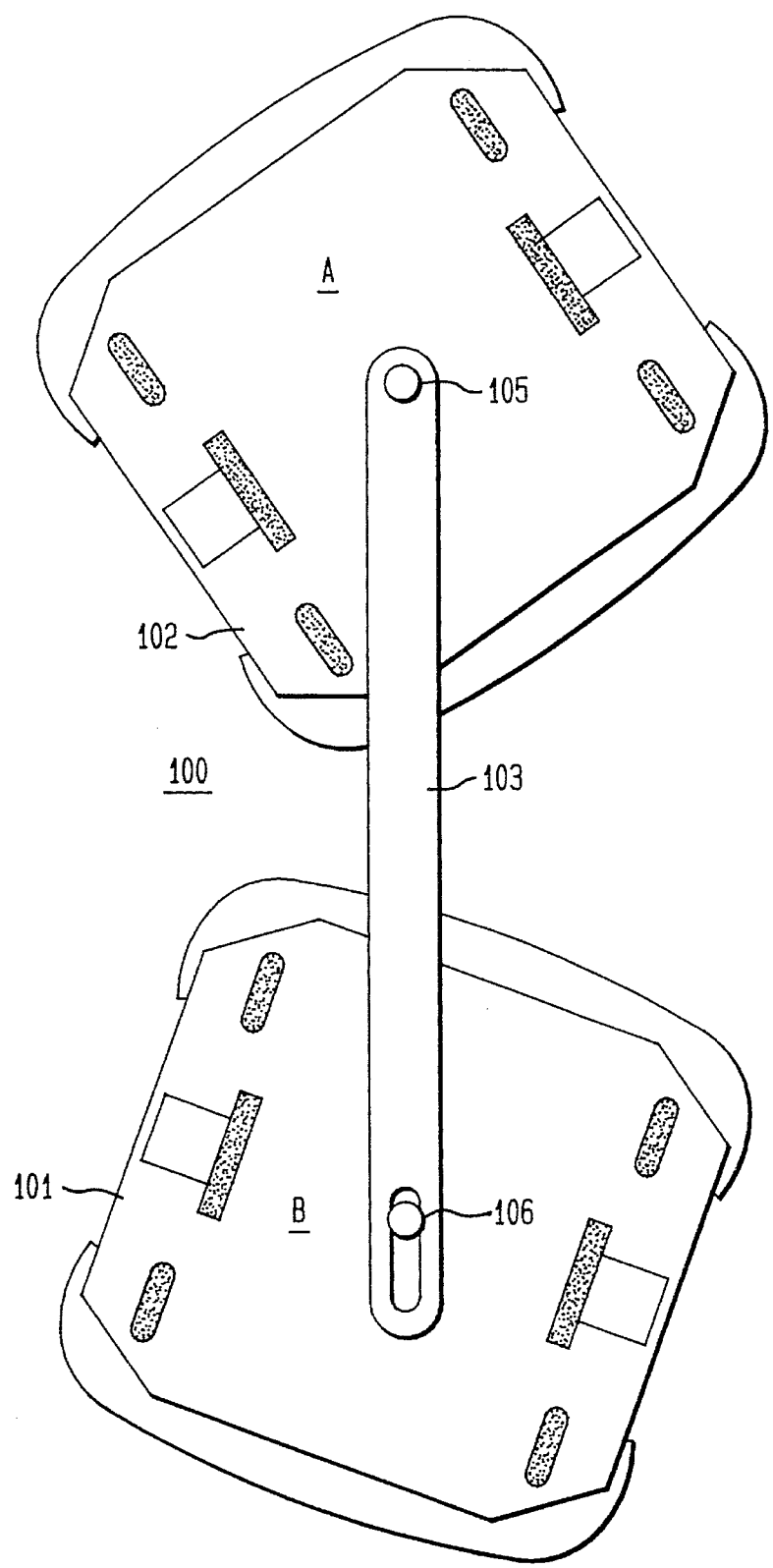
FIG. 6 is a schematic representation of a four-degree-of-freedom dual-differential drive vehicle which employs the compliant linkage concept of the present invention.

FIG. 6 shows an experimental apparatus 100 basically comprised of two differential drive arrangements 101 and 102, each being substantially as described with respect to FIG. 5. Differential drive arrangements 101 and 102 are coupled to each other via a rigid link 103 whereby each is permitted to pivot to achieve a steering function.

Differential drive arrangement 102 is coupled to rigid link 103 at a pivot 105 which may be in the form of a vertical joint, with an encoder (not shown in this figure) which produces a signal responsive to the orientation of the differential drive with respect to the rigid link. Similarly, differential drive arrangement 101 is coupled to the rigid link at a pivot 106, which also has an associated encoder (not shown). As described hereinabove, pivot 106 is permitted to slide longitudinally with respect to the rigid link, and there is additionally provided a longitudinal encoder (not shown) which issues a signal responsive to the location of the pivot along the rigid link. Positional feedback is therefore provided by the (1) linear and (2) absolute rotational encoders, none of which are shown in the drawing, but all of which are commercially available and within the knowledge of persons of ordinary skill in the art.

Figure 7:
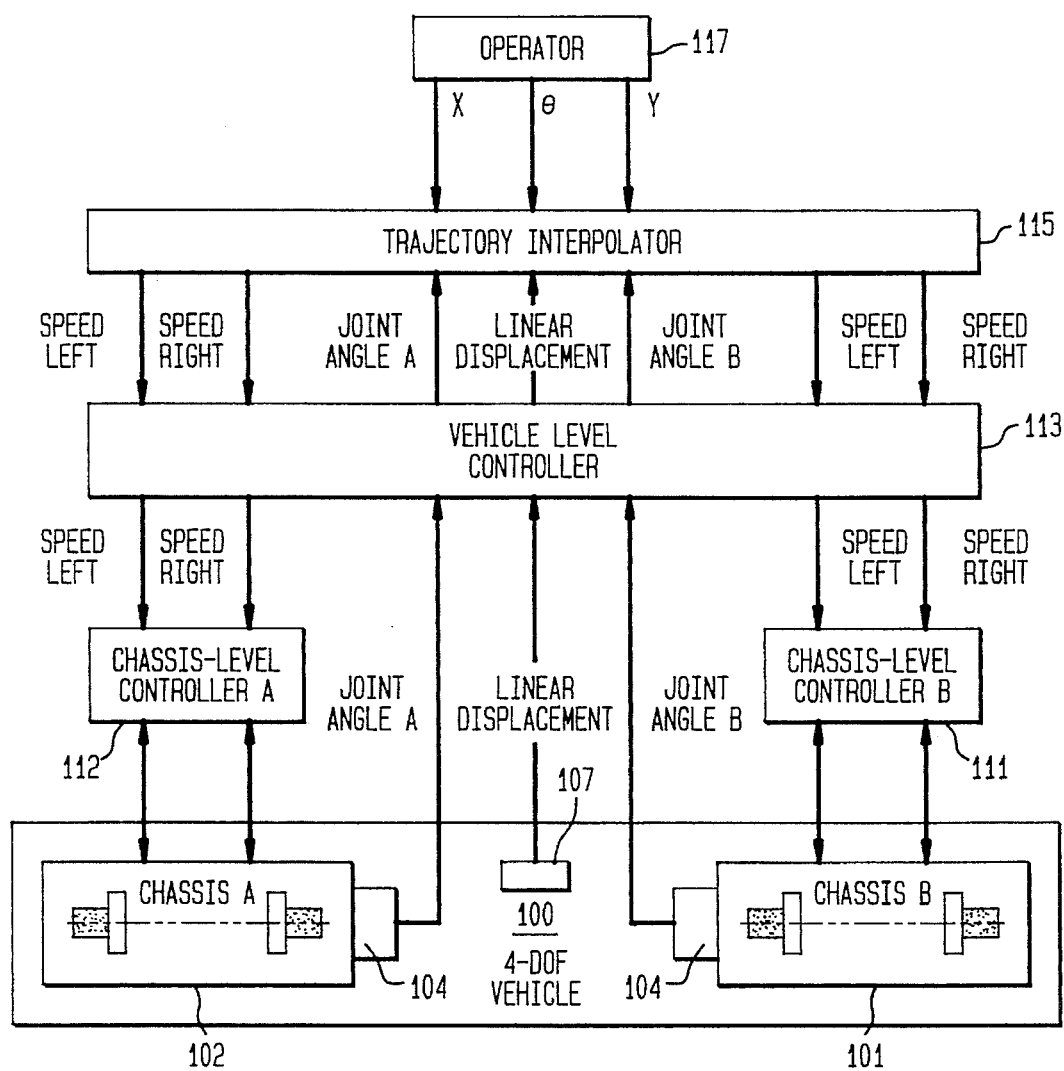
FIG. 7 is a schematic representation of a specific illustrative arrangement of controllers for a MDOF vehicle constructed in accordance with the principles of the invention.

FIG. 7 is a schematic representation of an arrangement of controllers for the 4-DOF vehicle described generally with respect to FIG. 6. As shown in FIG. 7, vehicle 100 is represented by a function block containing chassis 101 and 102. Each chassis has associated therewith a respective chassis-level controller 111 and 112. Chassis-level controllers 111 and 112 receive speed information from a vehicle level controller 113. Controller 113 supplies speed right and speed left data to each chassis-level controller, which in turn controls the drive motors of the respectively associated chassis. Each chassis provides to the vehicle level controller, via a respective one of rotary encoders 104, a respective data corresponding to the joint angle of pivots 105 and 106. Additionally, the linear displacement data which corresponds to the distance between the chassis is provided to the vehicle level controller via linear encoder 107.

The task of chassis-level controllers 111 and 112 is to maintain the proper speed ratio between the left and right drive wheels of each chassis. The implementation of these controllers is based on the cross-coupling control method previously developed in part by the inventor herein. Vehicle level controller 113 is designed to minimize fluctuations in the length of the compliant link which connects the two chassis. This controller, therefore, adjusts the relative speed between the two chassis. This speed, in turn, is governed by the absolute speed of the chassis and its orientation relative to the link. The difficulty which is overcome by this controller is visualized by considering two extreme cases. First, in the case where both chassis are oriented 90° sideways, the relative speed is always zero, and the link length can only be controlled by changing the orientation of either chassis. In the alternative extreme situation where both chassis are aligned longitudinally, the link length can only be controlled by changing the speed of a chassis motor.

Figure 1:
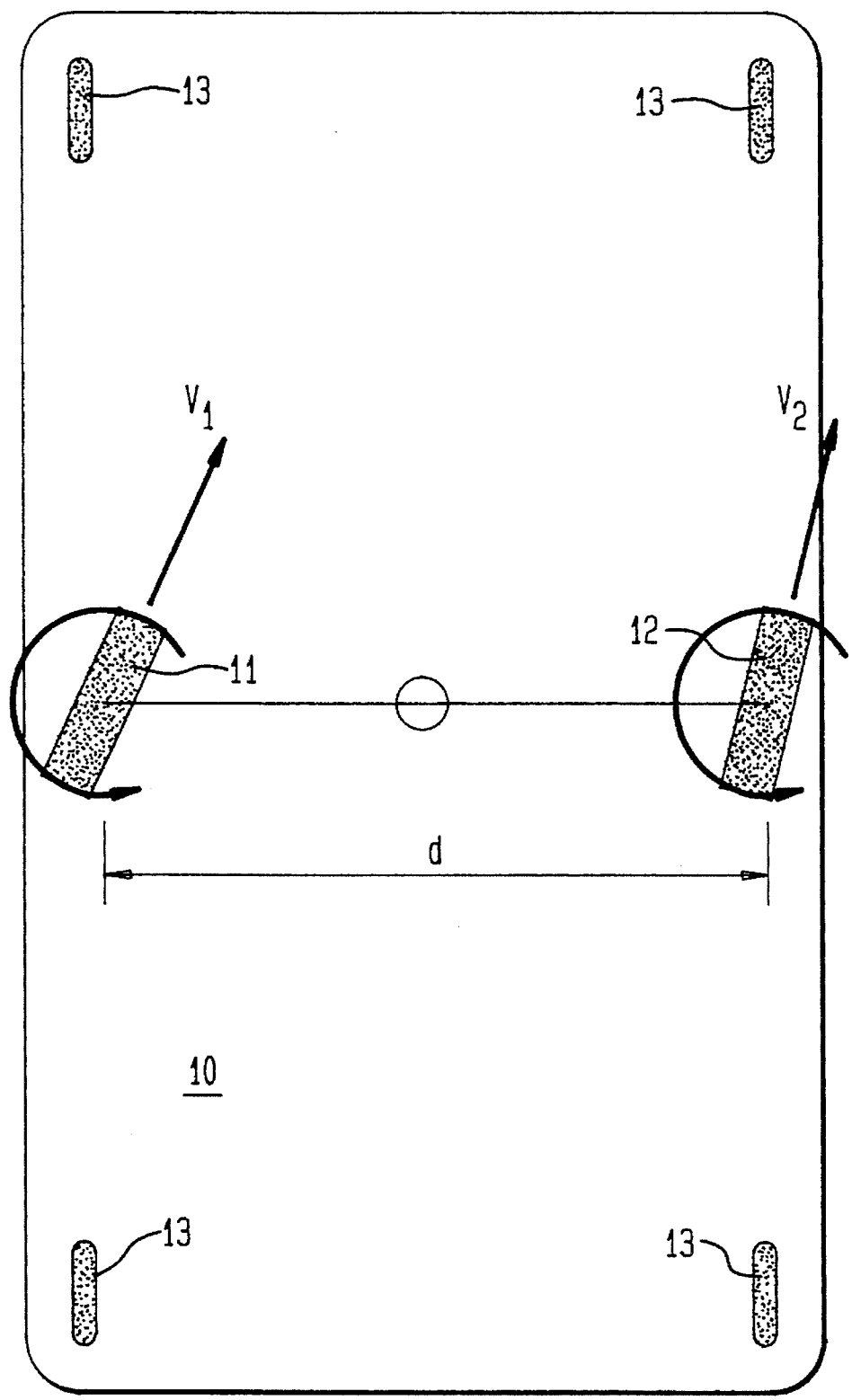
FIG. 1 is a schematic representation which is useful to illustrate a prior art four-degree-of-freedom vehicle.
Figure 2:
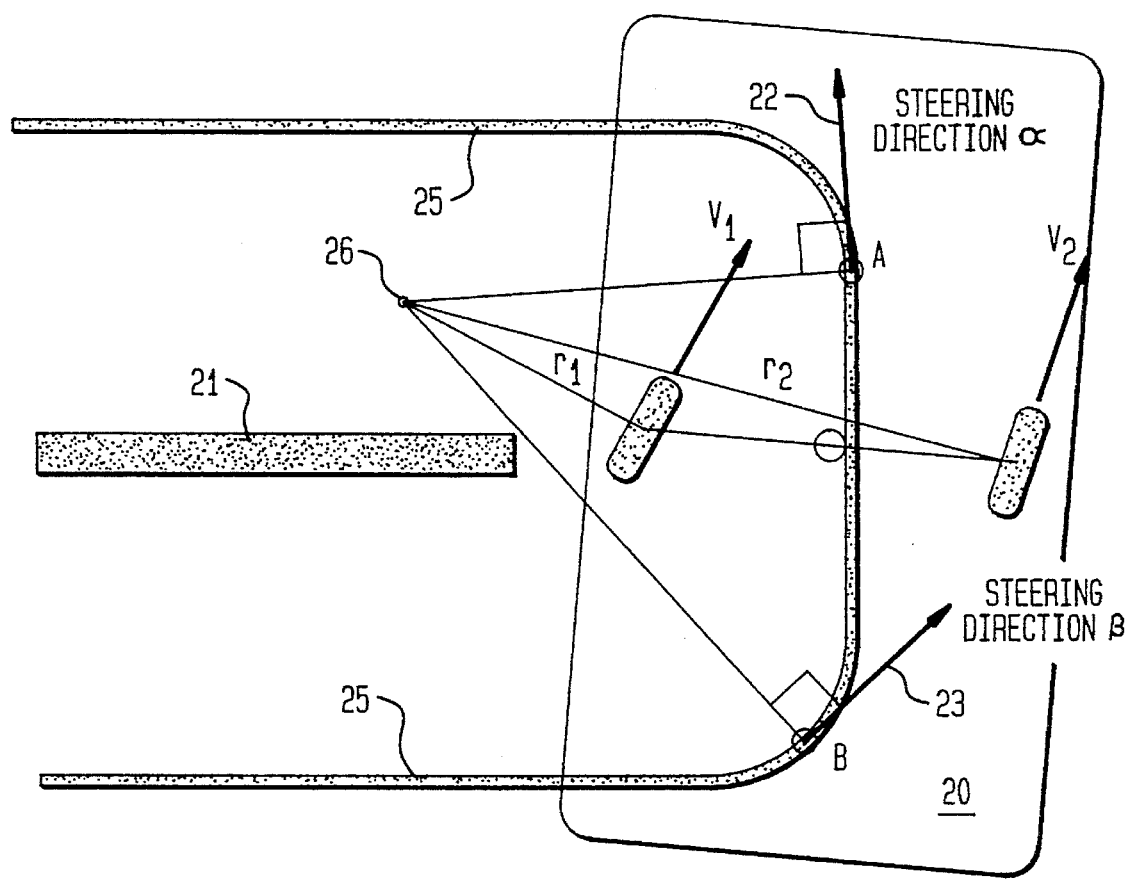
FIG. 2 is a schematic representation which is useful to illustrate the controlling of a four-degree-of-freedom vehicle using the known instantaneous center of rotation approach.
Figure 3:
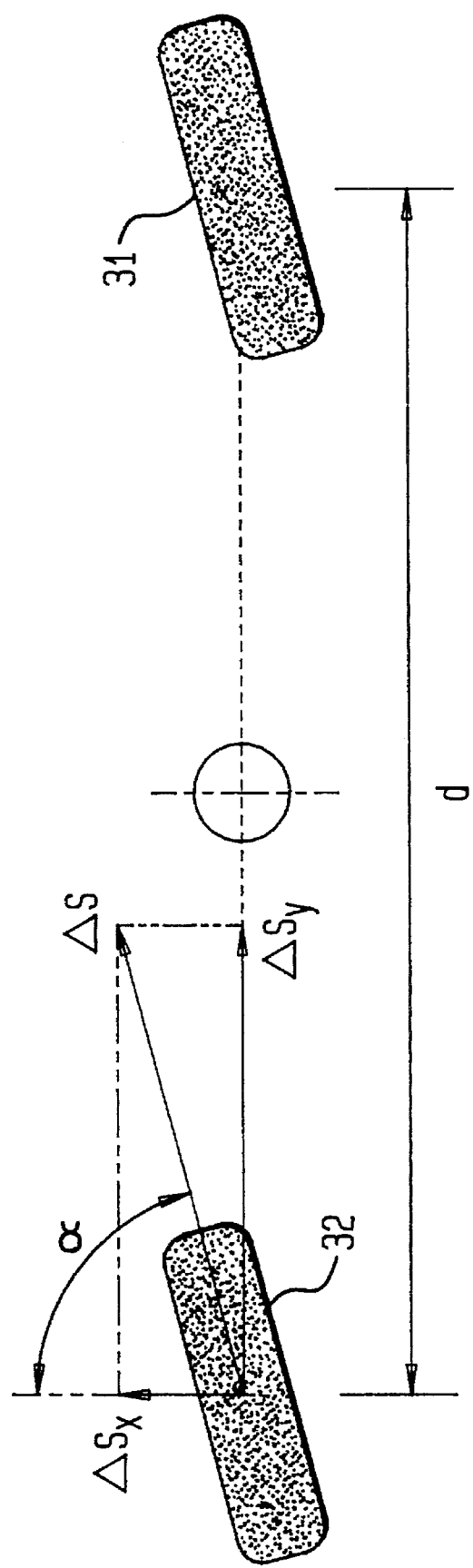
FIG. 3 is a schematic diagram which is useful to illustrate a source of position error Δs.

Vehicle level controller 113 is coupled to a trajectory interpolator 115. In this specific illustrative embodiment of the invention, trajectory interpolator 115 generates reference velocity signals which would result in a specific trajectory for the vehicle, such as the one shown in FIG. 2. The instantaneous center of rotation method described hereinabove with respect to FIG. 2 is only one possibility for implementing a trajectory interpolator, and it is suitable for automatic vehicle operation. Since there are many applications in which a human operator remotely steers the vehicle, or has to program a trajectory explicitly for the vehicle, this interpolator is designed to allow a human operator to control robot motion with a 3-DOF joy stick, represented herein by operator controller 117 in FIG. 7. The interpolator, when used in combination with the operator controller, provides a more intuitive way than the ICR method for controlling the trajectory of the vehicle.

In usage, trajectory interpolator 115 translates joy stick x or y deflections into linear Cartesian coordinate motion (e.g., an x-deflection will cause pure sideways grabbing, and a y-deflection with cause pure forward travel). The third axis, θ, will cause pure rotation. A further refinement is an alignment option, where the θ-axis is used to specify an absolute orientation with which the vehicle attempts to align at all times. This option is convenient for the operator when, for example, the vehicle travels through a narrow corridor, or when the vehicle emerges from a corridor with a known orientation of, say, σ=90°, and then traverses an open work space to dock with a station at σ=120°. In this case, the operator would need only to adjust the θ-axis to 120°. The trajectory interpolator then takes care of the alignment while the operator steers the vehicle toward the docking station, using only x and y commands.

COMPUTER-SIMULATED RESULTS

Figure 8A:
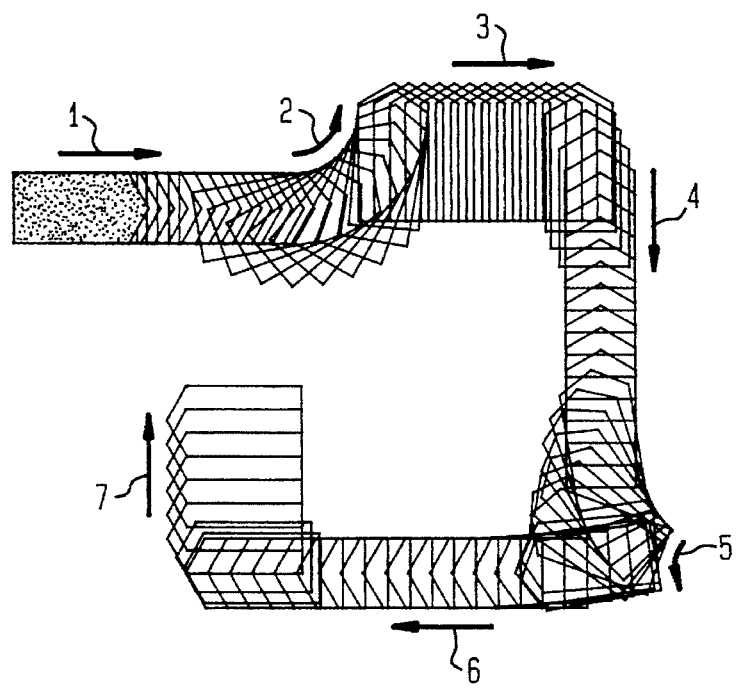
FIG. 8a is a diagram which illustrates a computer simulation run of a dual-differential drive four-degree-of-freedom vehicle which employs the compliant linkage concept of the present invention.
Figure 8B:
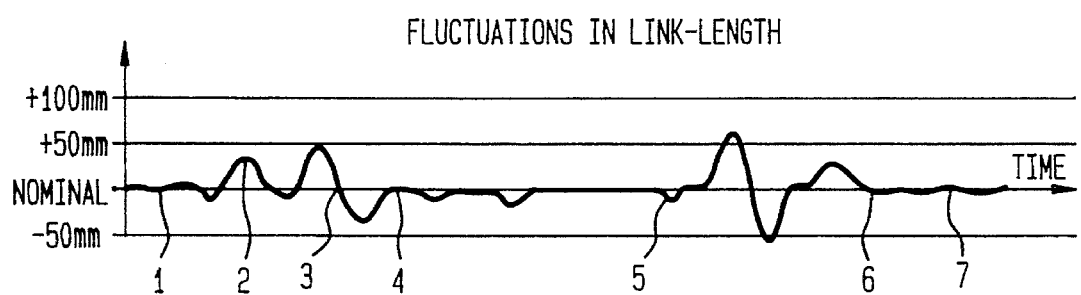

In order to test the feasibility of the design disclosed herein, a comprehensive simulation program was written, which closely simulates the dynamic behavior of an actual robot. The program was written to include all of the components identified in FIG. 7. FIG. 8a shows a typical run of the simulated 4-DOF vehicle. Special attention was paid to the fluctuations of the compliant link, ΔL. FIG. 8b is a graphical plot which illustrates the fluctuations in the length of the compliant link during the simulated run of FIG. 8a. As can be seen, dramatic steering maneuvers cause fluctuations in ΔL, but are all well within a reasonable range. FIGS. 8a and 8b are correlated using positions numbers one through seven. The vehicle starts at position one and rotates 90° left at position two. It continues to travel sideways (crabbing) at position three and then travels backward at position four. At position five, the vehicle rotates 90° to the left, and travels forward at position six. Sideways travel (crabbing) is performed at position seven. The values of ΔL indicate the amount of slippage that would occur without the mechanical compliance of the present invention. It is evident from FIG. 8b that conventional vehicles, i.e., those that do not have mechanical compliance built in, suffer from severe slippage.

Figure 9:
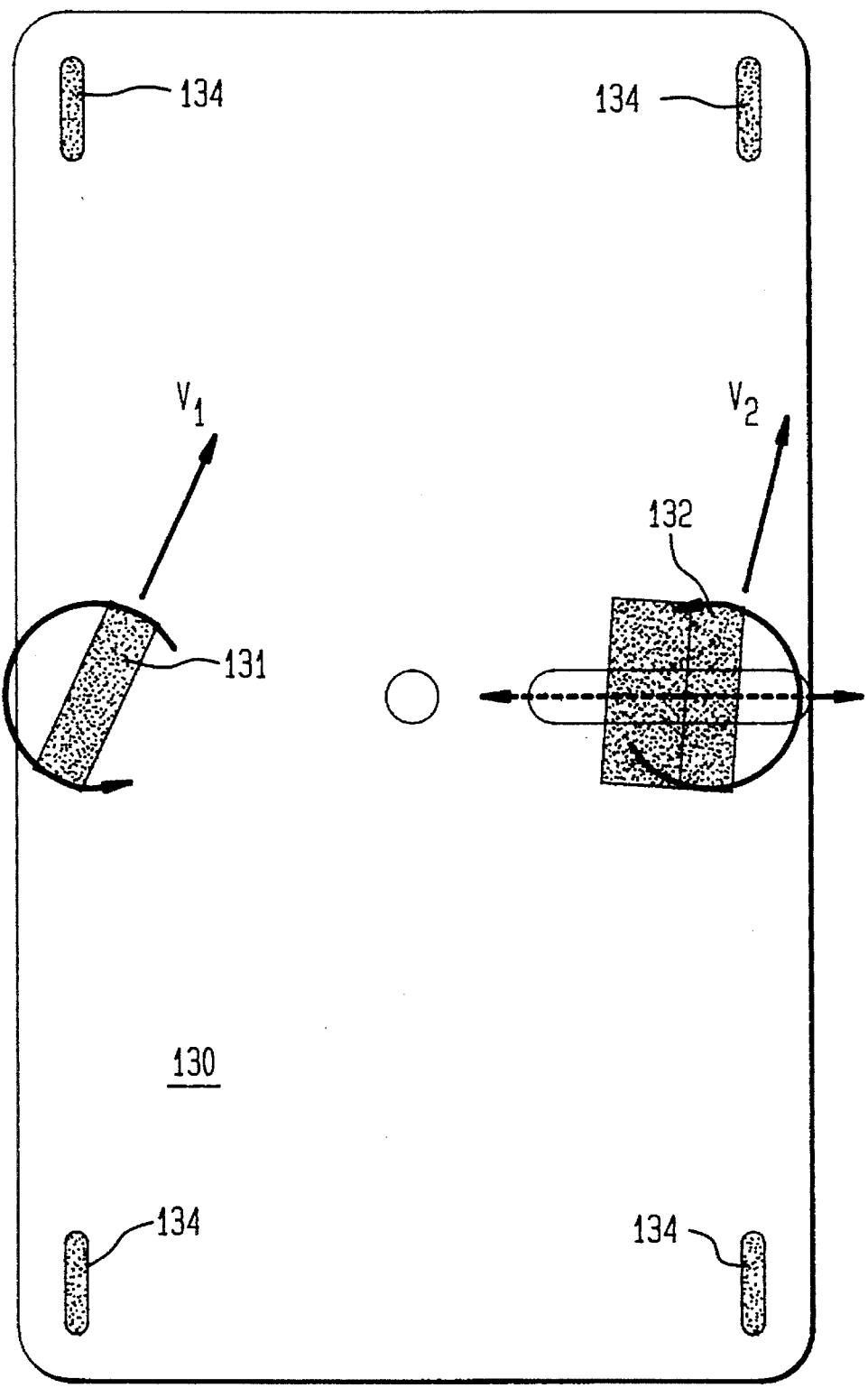
FIG. 9 is a schematic representation of a dual tricycle drive vehicle which employs a compliance linkage in accordance with the principles of the present invention.

The dual differential design described hereinabove represents but one embodiment of the compliance linkage concept described herein. FIG. 9 is a schematic representation of a dual tricycle drive vehicle which employs a compliance linkage in accordance with the principals of the present invention. As shown, dual tricycle drive ("DTD") vehicle 130 shown in FIG. 9 is provided with drive wheels 131 and 132, and a castor 134 at each corner thereof. Drive wheel 131 is arranged to steer by pivoting, as indicated by the circular arrow. Similarly, drive wheel 132 also pivots, but is additionally permitted to travel laterally toward drive wheel 131, in a manner similar to that described hereinabove.

Figure 10A:
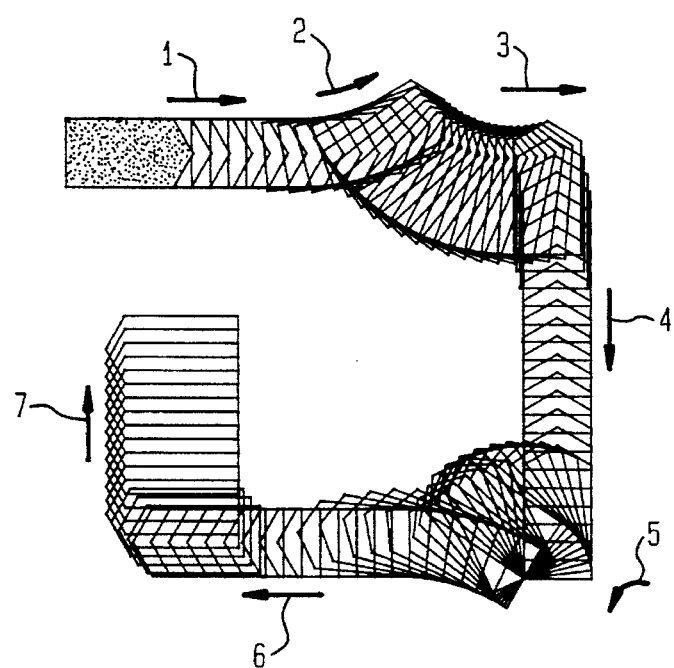
FIG. 10a is a computer simulation run of a dual tricycle drive vehicle employing the compliant linkage concept of the present invention.
Figure 10B:
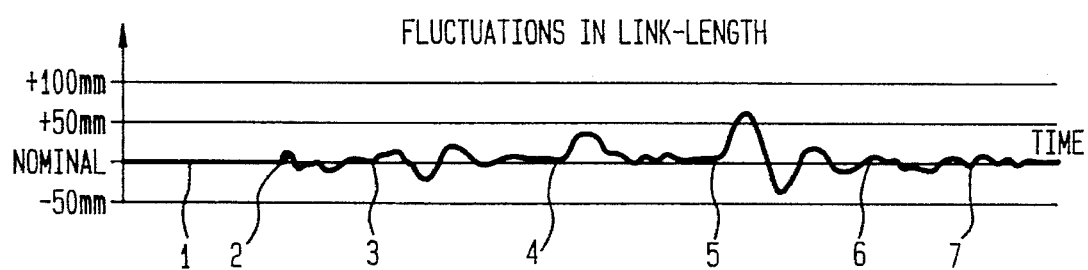

A simulation program similar to that described hereinabove with respect to FIGS. 8a and 8b was prepared and ran, and the results thereof are shown in FIGS. 10a and 10b, which are similar in nature to the results of simulation discussed previously. FIGS. 10a and 10b are correlated to one another by 1–7 which indicate various positions of the vehicle during the simulation ran. As shown in FIG. 10a, the vehicle starts at position 1 and rotates left at position 2. It travels sideways (crabbing) at position 3 and then proceeds to travel backward at position 4. The vehicle rotates 90° to the left at position 5 and travels forward at position 6. Sideways travel is performed at position 7. Subjectively, it appears that the DTD design appears less stable than the DDD design when performing large maneuvers. In practice, this may require the control program to reduce the speed during such maneuvers, to avoid excessive fluctuation in the link length. For example, during the maneuvers at positions 2 and 5 of FIG. 10a, the forward speed of the vehicle had to be reduced (i.e., only a small amount of translatory motion could be superimposed on the vehicle rotation), if large link-length fluctuations were to be avoided. Also, somewhat larger oscillations are observed during full sideways crabbing, such as at positions 3 and 7, with the DTD design. The foregoing notwithstanding, both designs appear feasible, and it is believed that the performance thereof can be improved by optimizing the trajectory interpolators for each case.

The disclosed 4-DOF vehicle provides mobility modes that permit movement through tightly contained environments. This feature is of great importance for applications in nuclear power plants and in nuclear waste storage facilities. The dual differential drive design is particularly beneficial for those applications because it provides actuator redundancy, that is, the ability to function in the event that one motor, or even both motors of the same axle, fails. In such a case, both wheel of the axle are disengaged, like a "neutral" gear in automobiles, while the remaining axle with two controlled motors provides full motion capability. With this capability, the mobile robot can still perform many tasks, or at the very least, retrieve itself from the operation.

Another advantage of the compliant linkage concept is that is greatly improves dead reckoning, which is a widely used method in which the position of an automotive vehicle is determined by counting wheel revolutions with the help of incremental encoders. The ability to achieve accurate dead reckoning makes it possible to implement the automatic alignment feature discussed hereinabove. This an innovative form of operator assistance in operator controlled vehicles. Automatic alignment is beneficial in remote operator applications as well as in applications where the operator is actually riding the vehicle.

The DTD design may be less expensive to manufacture than the DDD design, but the DDD design appears to allow more stable control and offers several kinematic and dynamic advantages. More specifically, the dual differential drive system provides accurate control, since tricycle assemblies need large reduction gear ratios for steering, and backlash in this reduction gear translates immediately into a steering error. In other words, a backlash of $\beta°$ causes a steering error of $\delta=\beta°$. In differential drive systems, on the other hand, less reduction is required to power the drive wheels. The steering error is $\delta=\beta(D/b)$, where D is the wheel diameter and b is the wheel base. In a typical system, this ratio is on the order of 1:5, that is, the steering error due to backlash is reduced by a factor of 5.

The DDD system also enjoys improved traction since it has four driven wheels instead of only two. The four driven wheels provide traction particularly when the payload is unevenly distributed. In addition, the DDD design improves stability by widening the wheel base of the individual chassis, with sacrificing maneuverability of the vehicle. In either application, however, the concept of compliant linkage provides substantially improved dead reckoning accuracy, and it is therefore of great utility to the operator of autonomous or semi-autonomous multi-degree of freedom vehicle.

EXPERIMENTAL RESULTS

An experimental dual differential drive vehicle was built as described in FIG. 6, and tested as will be discussed herein. The experimental vehicle is about 1.4 m long, 0.6 m wide, and is built using two commercially available platforms which are marketed under the trademark Labmate®. The platforms are connected to one another by the previously described compliant linkage. In the experimental system, the top of the vehicle (not shown) extends to cover both platforms, and provides a continuous, flat loading space. A 486/33 MHz IBM-PC compatible computer (not shown) installed aboard the vehicle implements all three levels of control. The system is fully self-contained and draws power from four on-board batteries (not shown). A convenient way of manually controlling the vehicle is by means of a commercially available 4-Channel FM radio control system of the type that is commercially available and used for controlling model airplanes.

As previously discussed, the fundamental problem of existing MDOF vehicles is that the actual wheel velocities differ from the required wheel velocities, which are computed according to the kinematic constraints of the system (i.e., Eq. 1). Each violation of the kinematic constraints causes wheel slippage and, consequently, position errors. Some investigators have reported orientation errors on the order of 20%, after certain maneuvers by some known arrangements. Also as discussed, the compliant linkage design of the present invention eliminates such errors, as will become evident from the following experimental. Of course, there are still other causes for position errors, which affect 2-DOF vehicles as well as MDOF vehicles. The most prominent of these "conventional" errors are:

- Unequal wheel diameters
- Misalignment of wheels
- Non-point contact area between wheels and floor
- Uneven floors
- Slippage during turning maneuvers The compliant linkage design does not overcome errors produced by any of the above listed causes. But, as the experimental results below show, compliant linkage reduces the position errors of an MDOF vehicle to a level comparable to that of a 2-DOF vehicle.

Three different experiments will be discussed hereinbelow:

a. A square path experiment was selected because it can be compared to results of similar experiments that are reported in the literature;

b. a random path experiment was selected to exclude the possibility of a systematic reduction of errors which might be suspected in the highly structured square path experiment (although the square path experiment, if performed in both, clockwise and counter-clockwise directions, is a very good test for vehicle-specific errors); and c. a link-length experiment.

The Square Path Experiment

Figure 11:
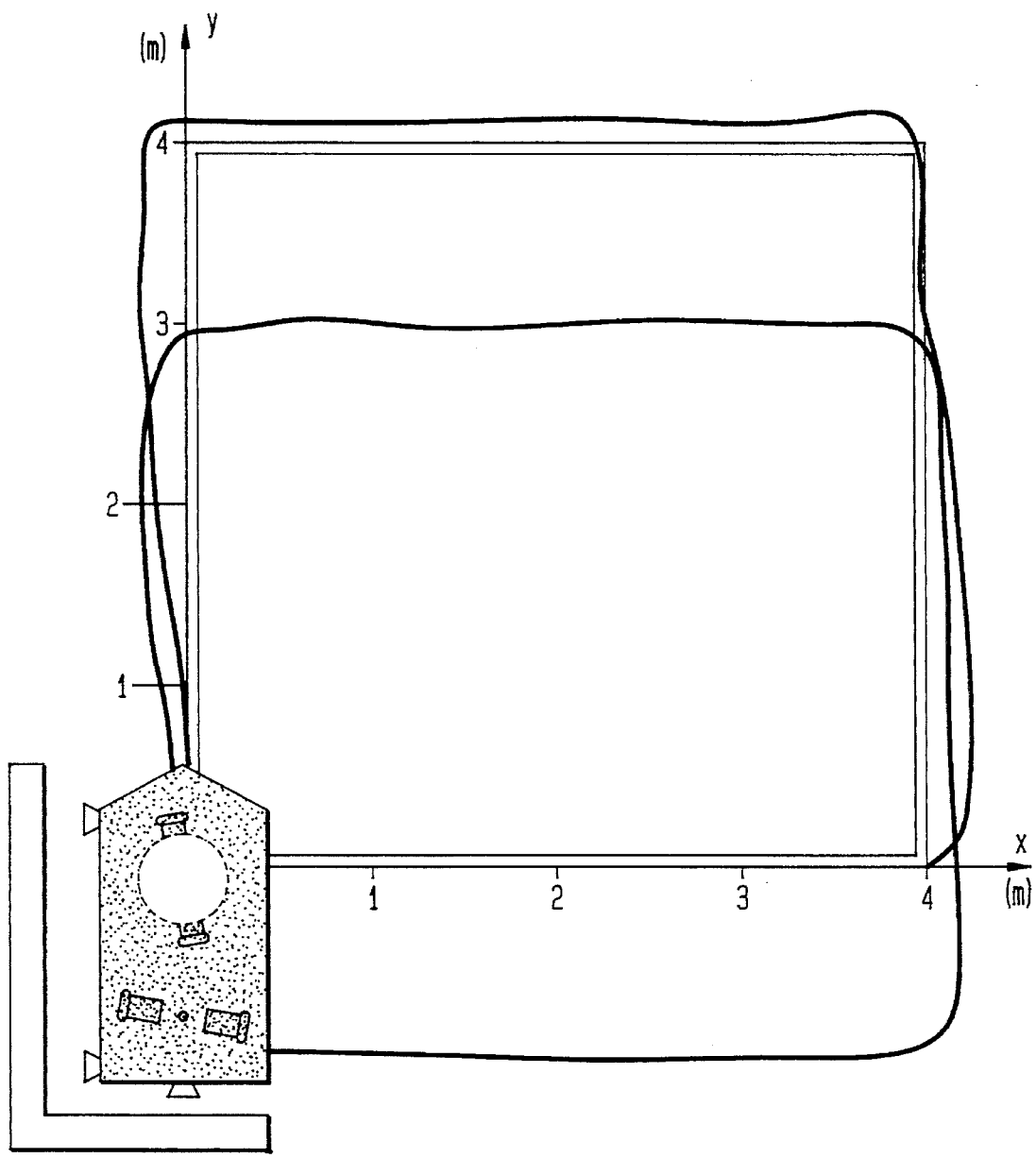
FIG. 11 is a diagram which illustrates the results of a square path experiment conducted using an experimental vehicle constructed in accordance with the principles of the invention.
Figure 12A:
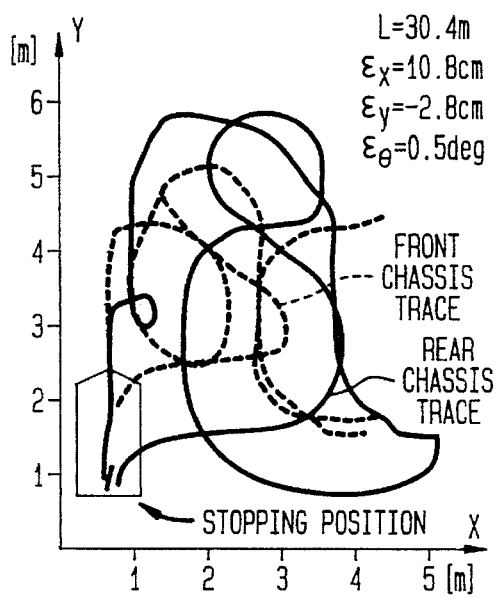
FIGS. 12a, 12b, 12c, and 12d are diagrams which show respective traces illustrating the paths of the front and rear chassis during respective runs of the vehicle under joystick control.
Figure 12B:
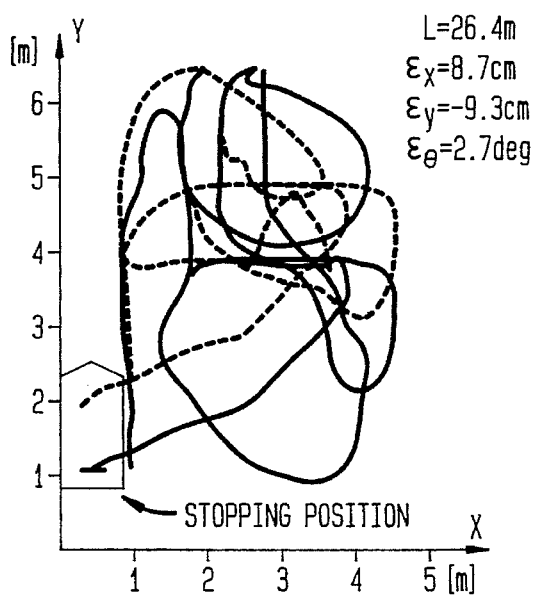
Figure 12C:
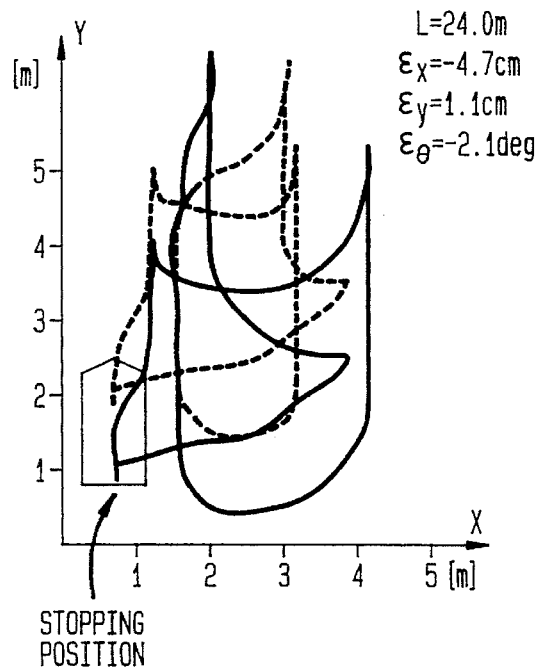
Figure 12D:
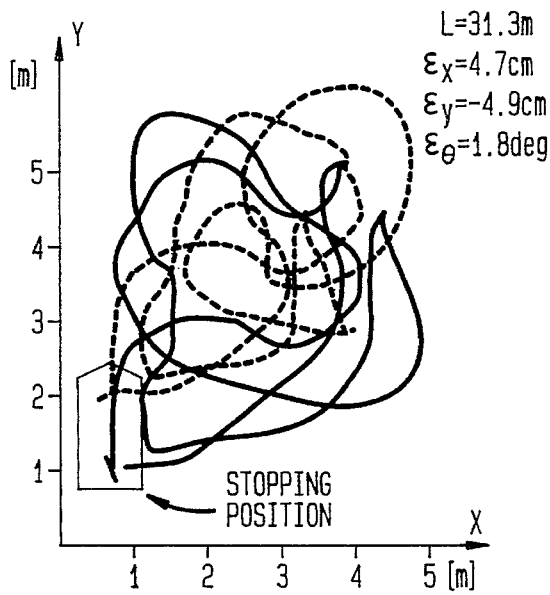

The results of the square path experiment are shown in FIG. 11. In this experiment the vehicle was programmed to pass by the corners of a 4×4 m square. To provide fluent, uninterrupted motion, the programmed path did not require the vehicle to stop at the intermediate points—passing-by at a distance of less than 0.2 m was sufficient. In order to measure the position errors after completing the path, the vehicle began and ended each run in an L-shaped corner, as shown in the figure. Three ultrasonic sensors were mounted on the vehicle, two sensors were facing the long side of the L-shaped corner, the third sensor faced the short side. The ultrasonic sensor system allowed to measure the absolute position of the vehicle to within ±2 millimeters in the x and y directions, and to about ±0.5° in orientation.

At the beginning of each run a sonar measurement was taken to determine the starting position of the vehicle. The vehicle then traveled through the programmed path and returned to the L-shaped corner, where the perceived position (i.e., the position the vehicle "thought" it had, based on dead-reckoning) was recorded. Then, a sonar measurement was taken to determine the absolute position. The difference between the absolute position and the perceived position was the position error. FIG. 13 shows the position errors for 5 runs in clockwise, and 5 runs in counter-clockwise direction. The worst error in all ten runs was in translation; all errors were less than ±1° in orientation. The average distance traveled in each run was approximately L=15.5 m (slightly less than 4×4 m since the vehicle didn't have to go precisely through the pre-programmed corner points), and the average speed in each run was slightly below 0.5 m/sec.

These experimental results compare well with those achievable by a very accurate 2-DOF mobile robot. The worst result of 10.7 cm error corresponds to 99.3% accuracy.

The Random Path Experiment

While the square path experiment described hereinabove is highly structured to allow comparison with other vehicles, the random path experiment is particularly unstructured, to obtain information on the behavior of the vehicle under real-world conditions. FIG. 12 shows 4 different experiments in which the vehicle was controlled by a joystick (not shown). Each one of the four graphs shows the trace of the front and rear chassis, as well as the position of the vehicle after completing the path. The overall travel distance L is shown for each run, and so are the lateral errors $\epsilon_x$, $\epsilon_y$, and the orientation error $\epsilon_\theta$. The errors were determined by comparing dead-reckoning information with sonar position measurements after completing a run, as explained in Section 6.1. The average speed for these runs was between 0.4 and 0.5 m/sec.

In all 4 runs shown in FIG. 12, crabbing motion and steering (i.e., changes in orientation) were mixed and were performed simultaneously. Under joystick control, an attempt was made to create "wild" and unpredictable movements, with many loops and turns. In Run 3, quick directional changes were emphasized, such as changing from 90°-sideways crabbing toward the right to 90°-sideways crabbing toward the left. Although the traces appear somewhat confusing at first glance, it is easy to distinguish between mostly sideways-crabbing motion where the traces of the front and rear chassis are further apart and mostly aligned motion, where the traces are closer together. It should be noted that the results shown in FIG. 12 are representative for the results from a much larger number of similar experiments. In these experiments the translation error was consistently less than 0.5% of the total path length. These results compare favorably with the motion accuracy reported for a known vehicle which uses an "orthogonal-wheels" concept for omnidirectional motion.

The Link-Length Experiment

The link-length experiment described herein documents the function of the controller system, specifically of the vehicle level controller. This controller aims at minimizing the fluctuation of the length of the compliant link, $\Delta l$. It is desirable that $\Delta l$ remains small, relative to the vehicle size) since large fluctuations would be difficult to accommodate from an engineering point of view.

Figure 13A:
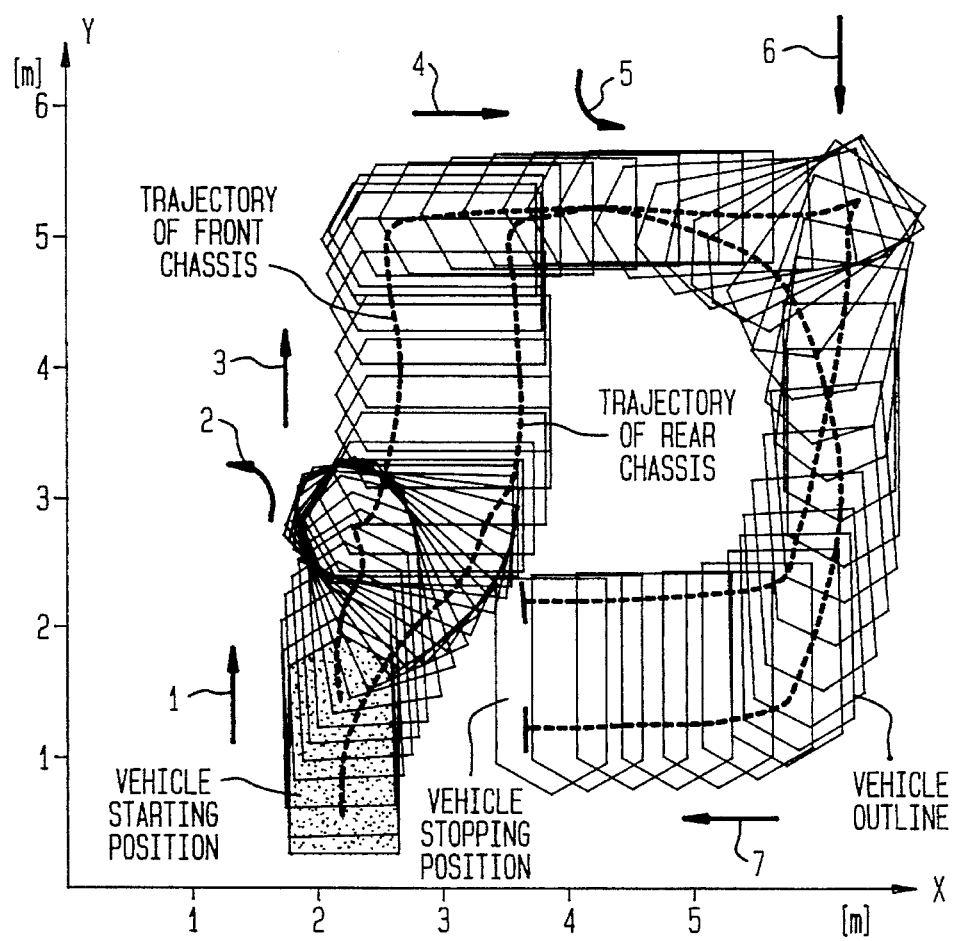
FIG. 13a is a diagram which illustrates an experimental run of an experimental vehicle which employs the compliant linkage concept of the present invention.

FIG. 13a is similar to FIGS. 8a and 10a, and shows sequential positions of the experimental vehicle during the execution of a preprogrammed motion-sequence. The trajectories of the center points of the front and rear chassis are also plotted. Seven different motions (labeled "Action 1" through "Action 7" in FIG. 13a) were performed, and the location of the front chassis at the moment a new action was invoked is marked. The motions include forward travel at action points 1 and 6, backward travel at action point 4, rotation at action points 2 and 5, and sideways crabbing at action points 3 and 7. The figure additionally shows combinations of these components, particularly as the motion of the vehicle is in transition from one type of motion to another. Furthermore, the whole sequence was performed fluently, without stopping between actions (i.e., types of motions). The maximum speed was set to $V_{max} = 0.8$ m/s. However, the trajectory interpolator reduces the maximum speed temporarily as a function of the rate of directional changes of the individual chassis. Consequently, the average speed for the run was $V_{avrg} = 0.42$ m/s.

Figure 13B:
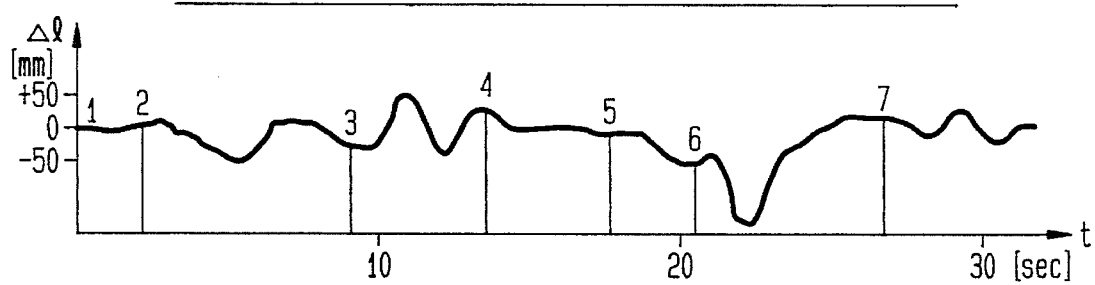

FIG. 13b is similar in nature to FIGS. 8b and 10b, and shows the fluctuations in link-length during the run. The maximum deviation from the nominal link-length L was approximately $\Delta l = 12$ cm, and it occurred shortly after action 6 was invoked. The compliant link shortened at this point because the rear chassis came to a complete halt to change direction (in the upper-right corner of FIG. 13a) while the front chassis was further approaching.

In conclusion, the inventor herein has introduced a new design for four-degree-of-freedom (4DOF) mobile robots. In this new design, a compliant linkage is used to accommodate temporary controller errors, which would otherwise violate the "rigid body constraint" and consequently cause wheel slippage. An experimental vehicle was built and extensively tested. The multi-level control system was found to provide reliably smooth and stable motion at speeds of up to 0.5 m/s, even under vigorous joystick control. It is believed that much higher speeds are feasible with more adequately designed drive chassis. It is to be remembered that the experimental vehicle employed commercially-available, off-the-shelf platforms, each with two heavy 12-Volt batteries on-board, which dramatically limited the responsiveness of the chassis to steering commands.

The concept of compliant linkage provides substantially improved dead-reckoning accuracy over existing 4-DOF vehicles, and is therefore of great advantage for the operation of autonomous or semi-autonomous multi-degree-of-freedom vehicles.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A drive arrangement for a vehicle having a plurality of drive wheels, the drive arrangement comprising:

first and second chassis members each having at least one of the plurality of drive wheels associated therewith, each chassis member being steerable with respect to the vehicle and coupled thereto at a predetermined nominal distance from one another;

distance monitoring means for producing distance data in the form of an electrical distance monitoring signal, said distance data being responsive to a variation in said predetermined nominal distance between said first and second chassis members, as the vehicle is driven;

first and second steering angle monitoring means, each associated with a respective one of said first and second chassis members, for producing respective first and second steering angle data in the form of first and second steering angle signals; and drive control means for receiving at a first input thereof said electrical monitoring signal and at second and third inputs thereof respective ones of said first and second steering angle signals, and for controlling the plurality of drive wheels in response to said distance monitoring signal and said first and second steering angle signals, whereby said variation in said predetermined nominal distance is minimized as the vehicle is driven.

2. The drive arrangement of claim 1 wherein there is further provided:

first coupling means for coupling said first chassis member to the vehicle; and said first steering angle monitoring means comprises a first rotation encoder means for producing said first steering angle signal responsive to a rotational orientation of said first chassis member with respect to the vehicle.

3. The drive arrangement of claim 2 wherein there is further provided:

second coupling means for coupling said second chassis member to the vehicle; and said second steering angle monitoring means comprises a second rotation encoder means for producing said second steering angle signal responsive to a rotational orientation of said second chassis member with respect to the vehicle.

4. The drive arrangement of claim 3 wherein said second coupling means comprises a compliant linkage means for permitting said second chassis member to move over a predetermined distance with respect to the vehicle.

5. The drive arrangement of claim 4 wherein said compliant linkage means is arranged to permit said second chassis member to move over a predetermined distance with respect to said first chassis member.

6. The drive arrangement of claim 1 wherein there is further provided compliance means for permitting said predetermined nominal distance between said first and second chassis members to vary.

7. The drive arrangement of claim 6 wherein the vehicle is a multi-degree-of-freedom vehicle, said drive control means is of the type which functions digitally having predetermined sample periods, and said compliance means comprises compliance linkage means arranged to accommodate displacement discrepancies between said first and second chassis members which would otherwise cause wheel slippage during operation of the vehicle until correction therefor is made by said drive control means in response to said distance monitoring signal.

8. A drive arrangement for a vehicle, the drive arrangement comprising:

a first drive assembly having at least a first drive wheel associated therewith, said first drive assembly being coupled to the vehicle at a first pivot point and being rotatable thereabout;

a second drive assembly having at least a second drive wheel associated therewith, said second drive assembly being coupled to the vehicle at a second pivot point and being rotatable thereabout, said second pivot point being displaceable so as to be located within a predetermined range of distances from said first pivot point;

distance monitoring means for producing distance data in the form of an electrical distance monitoring signal, said distance data being responsive to the distance between said first and second pivot points; and drive control means having an input for receiving said electrical distance monitoring signal, and first and second outputs for producing first and second drive signals, respectively, said first and second drive signals being applied to control said first and second drive wheels in response to said distance monitoring signal, whereby the distance between said first and second pivot points is maintained substantially constant as the vehicle is driven.

9. The drive arrangement of claim 8 wherein there is further provided at least one castor wheel associated with each of said first and second drive assemblies.

10. The drive arrangement of claim 8 wherein there are further provided first and second pivot drive means associated with respectively associated ones of said first and second drive assemblies for rotating said first and second drive assemblies about their respective first and second pivot points.

11. The drive arrangement of claim 10 wherein there is further provided controller means for controlling the operation of said first and second pivot drive means in response to said distance monitoring signal.

12. A drive arrangement for a vehicle, the drive arrangement comprising:

a first drive assembly having at least one drive wheel associated therewith, said first drive assembly being coupled to the vehicle;

a second drive assembly having at least one drive wheel associated therewith, said second drive assembly being coupled to the vehicle at a pivot point and being controllably rotatable thereabout, said pivot point being displaceable with respect to the vehicle;

displacement monitoring means for producing displacement data in the form of an electrical displacement monitoring signal, said displacement data being responsive to the variations in the displacement of said second drive assembly with respect to the vehicle as the vehicle is driven; and control means for issuing a control signal for controlling at least one of said first and second drive assemblies in response to said displacement monitoring signal, whereby said variations in the displacement of said second drive assembly with respect to the vehicle are minimized.

13. The drive arrangement of claim 12 wherein there is further provided pivot rotation drive means for controllably rotating said second drive assembly about said pivot point in response to said displacement monitoring signal.

14. The drive arrangement of claim 12 wherein there is further provided means for controlling said drive wheel of said second drive assembly in response to said displacement monitoring signal.

15. The drive arrangement of claim 12 wherein there is further provided means for controlling said drive wheel of said first drive assembly in response to said displacement monitoring signal.

16. A drive arrangement for a vehicle, the drive arrangement comprising:

a first drive assembly having a control input and at least one drive wheel associated therewith, said first drive assembly being coupled to the vehicle;

first steering means for steering said drive wheel of said first drive assembly;

a second drive assembly having a control input and at least one drive wheel associated therewith, said second drive assembly being coupled to the vehicle so as to be displaceable with respect thereto;

second steering means for steering said drive wheel of said second drive assembly;

displacement monitoring means for producing displacement data in the form of an electrical displacement monitoring signal, said displacement data being responsive to the displacement of said second drive assembly with respect to the vehicle as the vehicle is driven; and controller means having an input for receiving said electrical displacement monitoring signal, and an output for issuing a control signal, said control signal being responsive to said electrical displacement monitoring signal and being applied to said control input at least one of said first and second drive assemblies to control said displacement of said second drive assembly.

17. The drive arrangement of claim 16 wherein there is further provided first steering control means for controlling said first steering means in response to said electrical displacement monitoring signal.

18. The drive arrangement of claim 16 wherein there is further provided second steering control means for controlling said second steering means in response to said electrical displacement monitoring signal.

19. The drive arrangement of claim 16 wherein there is further provided means for controlling said drive wheel of said first drive assembly in response to said electrical displacement monitoring signal.

20. The drive arrangement of claim 16 wherein there is further provided means for controlling said drive wheel of said second drive assembly in response to said electrical displacement monitoring signal.

21. A drive arrangement for a vehicle, the drive arrangement comprising:

a first drive assembly having a control input and a first drive wheel associated therewith, said first drive assembly being coupled to the vehicle;

a first steering means for steering said first drive wheel;

a first steering monitor means for producing first steering angle data in the form of a first electrical steering monitor signal, said first steering angle data being responsive to the steering orientation of said first drive wheel;

a first drive assembly controller for controlling said first drive wheel, said first drive assembly controller having an input for receiving a first drive wheel control signal for controlling a speed of rotation of said first drive wheel;

a second drive assembly having a control input and a second drive wheel associated therewith, said second drive assembly being coupled to the vehicle so as to be displaceable with respect thereto;

a second steering means for steering said second drive wheel;

a second steering monitor means for producing second steering angle data in the form of a second electrical steering monitor signal, said second steering angle data being responsive to the steering orientation of said second drive wheel;

a second drive assembly controller for controlling said second drive wheel, said second drive assembly controller having an input for receiving a second drive wheel control signal for controlling a speed of rotation of said second drive wheel;

displacement monitoring means for producing displacement data in the form of an electrical displacement monitoring signal responsive to the displacement of said second drive assembly with respect to the vehicle as the vehicle is driven; and vehicle level control means for issuing a control signal to the control input of at least one of said first and second drive assemblies in response to said electrical displacement monitoring signal for controlling the displacement of said second drive assembly with respect to the vehicle.

22. The drive arrangement of claim 21 wherein there is further provided vehicle controller means for coordinating the operations of said first and second drive assemblies, said vehicle controller means having:

a first input for receiving said electrical displacement monitoring signal;

a second input for receiving said first electrical steering monitor signal;

a third input for receiving said second electrical steering monitor signal;

a first output coupled to said first drive assembly controller for producing a first drive wheel speed control signal; and a second output coupled to said second drive assembly controller for producing a second drive wheel speed control signal.

23. The drive arrangement of claim 22 wherein there is further provided operator control means coupled to said vehicle controller means for providing thereto:

an x-displacement signal containing x-data which corresponds to an x-displacement desired by the operator to be executed by the vehicle;

a y-displacement signal containing y-data which corresponds to a y-displacement desired by the operator to be executed by the vehicle; and a θ-displacement signal containing θ-data which corresponds to a θ-displacement desired by the operator to be executed by the vehicle.

24. The drive arrangement of claim 23 wherein there is further provided trajectory interpolator means arranged to receive said x-displacement, y-displacement, and θ-displacement signals for providing to said vehicle controller means trajectory signals corresponding to at least a first trajectory interpolated control signal.

25. The drive arrangement of claim 24 wherein said trajectory interpolator means is provided with an alignment controller means for effecting a desired orientation of the vehicle at a predetermined location along a predetermined vehicle path.

26. A system for driving a vehicle along a surface, the system comprising:

first and second drive assemblies for urging the vehicle to travel along the surface, each of said drive assemblies having at least a first drive wheel for engaging with the surface and being coupled to a respectively associated first drive means;

distance monitoring means for producing distance data in the form of an electrical distance signal, said distance data being responsive to a distance between said first and second drive assemblies as the vehicle is driven;

motor control means for controlling a speed of at least one of said drive means in response to said electrical distance signal; and motor control means for controlling a speed of at least one of said first and second drive means in response to said electrical distance signal for controlling the distance between said first and second drive assemblies.

27. The system of claim 26 wherein at least one of said first and second drive assemblies is a drive chassis, said drive chassis being provided with a second drive wheel for engaging with the surface and being coupled to an associated second drive means, said motor control means being arranged to control a relative speed of rotation of said first and second drive means of said drive chassis in response to said electrical distance signal.

28. A method of maneuvering a vehicle, the method comprising the steps of:

applying steering and drive signals to each of two drive chassis coupled to the vehicle whereby the distance between the two drive chassis varies over a predetermined range of distances;

producing distance data in the form of and electrical distance signal, said distance data being responsive to variations in the distance between the two drive chassis as the vehicle is driven; and controlling at least one of said steering and drive signals in response to the electrical distance signal, whereby the variations in the distance between the two drive chassis are minimized.

29. The method of claim 28 wherein there is further provided the step of trajectory interpolating for producing control signals which specify a predetermined trajectory for the vehicle.

30. The method of claim, 29 wherein said step of trajectory interpolating is responsive to operator control signals corresponding to respective directions of travel of the vehicle.

* * * * *

UNITED STATES PATENT AND TRADEMARK OFFICE
CERTIFICATE OF CORRECTION

PATENT NO. : 5,456,332            Page 1 of 2
DATED      : October 10, 1995
INVENTOR(S) : Johann Borenstein It is certified that error appears in the above-indentified patent and that said Letters Patent is hereby corrected as shown below:

Col. 3, line 26, change "As" to -- $\Delta$s --;

Col. 3, line 42, change "as" to -- $\Delta$s --;

Col. 12, line 18, change "ran" to -- run --;

Col. 12, line 23, change "ran" to -- run --;

Col. 12, line 52, change "wheel" to -- wheels --;

Col. 12, line 63, after "This" insert -- is --;

Col. 13, line 20, change "with" to -- without --;

UNITED STATES PATENT AND TRADEMARK OFFICE
CERTIFICATE OF CORRECTION

PATENT NO. : 5,456,332
DATED : October 10, 1995
INVENTOR(S) : Johann Borenstein

It is certified that error appears in the above-indentified patent and that said Letters Patent is hereby corrected as shown below:

Col. 15, line 31, change ")" to -- , --; and

Col. 20, line 54, change "and" to --an--.

Signed and Sealed this

Eleventh Day of February, 1997

Attest:

BRUCE LEHMAN

*Attesting Officer*  *Commissioner of Patents and Trademarks*